Dec. 27, 1932.  H. SCHMIEG  1,892,587
TUBE COUPLING
Filed May 2, 1932  2 Sheets-Sheet 1

Harry Schmieg
INVENTOR

BY Victor J. Evans & Co.
ATTORNEYS

Dec. 27, 1932.  H. SCHMIEG  1,892,587
TUBE COUPLING
Filed May 2, 1932   2 Sheets-Sheet 2

Harry Schmieg
INVENTOR
BY Victor J. Evans & Co.
ATTORNEYS

Patented Dec. 27, 1932

1,892,587

UNITED STATES PATENT OFFICE

HARRY SCHMIEG, OF EAST ST. LOUIS, ILLINOIS

TUBE COUPLING

Application filed May 2, 1932. Serial No. 608,773.

This invention relates to pipe couplings and its general object is to provide a U-bend coupling for connecting the ends of parallel pipes or tubes together in an easy and expeditious manner and whereby the joint is made secure and leak proof without the use of packing, and threaded securing means and the like.

A further object of the invention is to provide a U-bend coupling with clamping means to assure a leak proof joint and is simple in construction, inexpensive to manufacture and extremely efficient in operation and service.

This invention also consists in certain other features of construction and in the combination and arrangement of the several parts, to be, hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
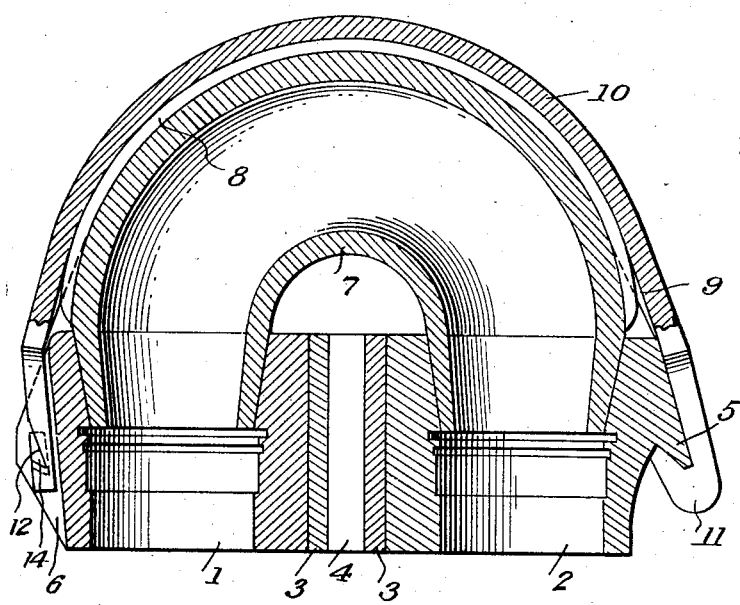
Figure 1 is a vertical sectional view taken through one form of my invention.

Referring to the drawings in detail, it will be noted that in both forms of my invention I provide a pair of pipe or tube receiving sections and for distinction in the form as shown in Figures 1 to 4 inclusive, one of these sections is indicated by the reference numeral 1 while the other by the reference numeral 2. Each of the sections include a conical collar and these collars have extending from the entire length of one side thereof right angle flanges 3 which have formed therewith tongues 4 that cooperate with the flanges for connecting the sections of a coupling together in a manner whereby the tongues and flanges are disposed in hooked or overlapped relation as clearly shown in Figure 3.

The section 2 has formed with its opposite side a downwardly and outwardly inclined lug 5, while the section 1 has formed with its opposite side a pair of spaced parallel ears 6 which cooperate with the lug 5 in a manner which will be presently apparent.

Arranged in the sections 1 and 2 in wedging engagement therewith are the tapered ends of a tubular U-shape coupling member 7 that is provided with a rib 8 formed on the outer side thereof and following its longitudinal curvature for the purpose of being received in a groove 9 that is provided in the inner face of a curved clamping member 10 which I refer to as being a saddle clamp.

One end of the saddle clamp has formed therewith a hook 11 that receives the lug 5 while the opposite end of the saddle clamp is provided with a notch 12. The opposite end is received between the ears 6, with the notch 12 aligned with slots 13 formed in the ears 6 to receive a wedge 14 that passes through the slots 13 as well as through the notch 12 as shown in Figure 2, with the result it will be obvious that the saddle clamp not only fixes the tubular U-shape coupling member with the sections 1 and 2 but provides a leak proof connection between these elements without the use of packing, due to the wedging action between the tapered ends of the tubular U-shape coupling member and the collars of the sections.

Figure 2:
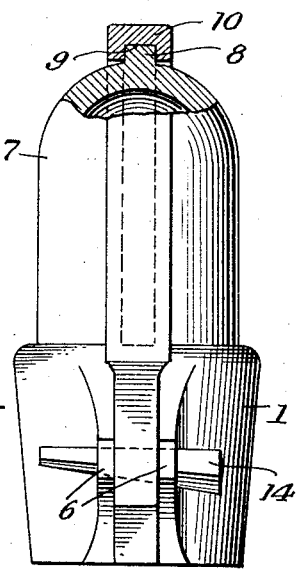
Figure 2 is an end elevation thereof.
Figure 3:
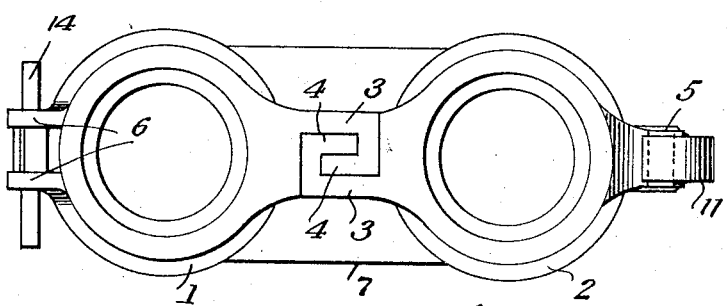
Figure 3 is a bottom plan view.
Figure 5:
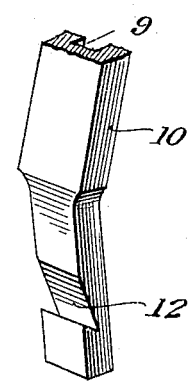
Figure 5 is a fragmentary view illustrating the wedge receiving end of the saddle clamp.
Figure 4:
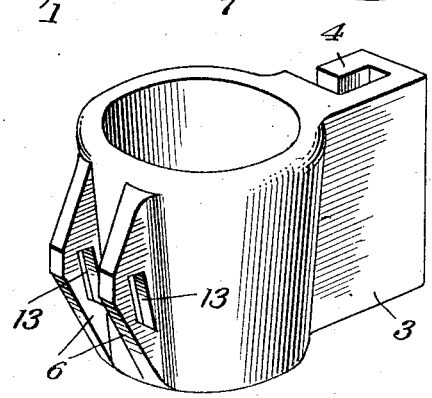
Figure 4 is a perspective view of one of the sections which forms a part of my coupling.

It will be noted that upon inspection of Figures 2, 4 and 5, that the wedge, slots and notch are of a particular shape. In other words, the slots and notch are provided with inclined walls arranged at sharp angles with respect to each other and the wedge is shaped for fitting engagement with the walls. Due to the particular shape of these elements, casual removal or displacement of the wedge is practically impossible, therefore a leak proof joint is assured.

Figure 6:
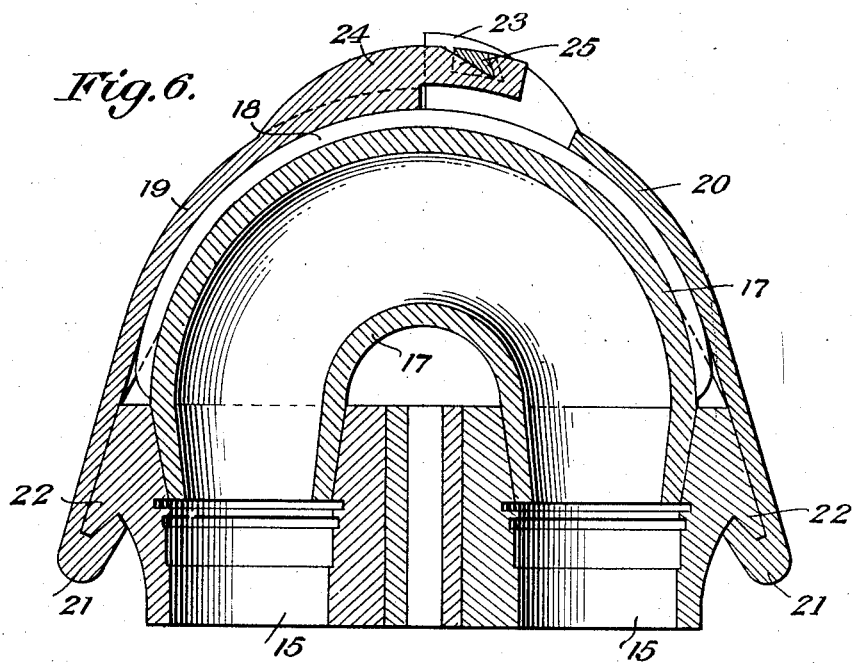
Figure 6 is a vertical sectional view taken through a modified form of my invention.
Figure 7:
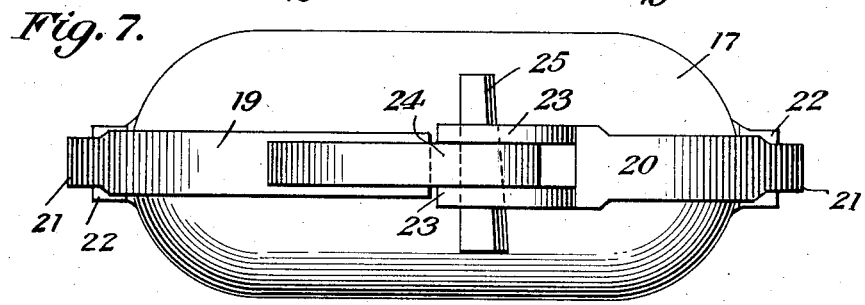
Figure 7 is a top plan view thereof.
Figure 8:
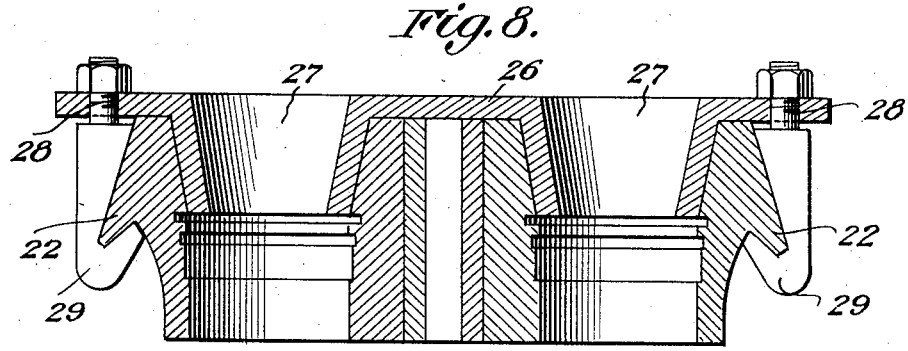
Figure 8 is a vertical sectional view taken through the coupling sections and illustrating the application of a jig for securing the sections together so as to swage or fix the tubing thereto prior to applying the U-bend and clamping means to the sections.

In Figures 6, 7 and 8 the sections are identical in every respect and are indicated by the reference numeral 15. The sections 15 likewise include conical collars and have formed with their inner faces flanges and tongues similar to the flanges 3 and tongues 4, and the flanges and tongues of the sections 15 are likewise arranged in hooked or overlapped relation for securing the sections 15 together.

Disposed in the collars of the sections 15 are the tapered ends of a tubular U-shape coupling member 17 and this coupling member 17 is provided with a rib 18 arranged longitudinally of the top thereof to be received in grooves of the sections 19 and 20 of a saddle clamp, and it will be noted that the sections 19 and 20 have formed with the outer ends thereof hooks 21 to receive lugs 22 formed with the outer sides of the sections 15. The inner end of the section 20 of the saddle clamp has formed therewith and rising therefrom spaced parallel ears 23 that are provided with aligned slots and receive an extension 24 that is formed with the inner end of the section 19 of the saddle clamp. The extension is provided with a notch adapted to be aligned with the slots of the ears 23 for the purpose of receiving a wedge 25 for fixedly associating the saddle clamp with respect to the sections 15 and tubular U-shape coupling member 17.

In order to rigidly hold the coupling sections or in other words the sections 1 and 2 together, or the sections 15 together, for the purpose of swaging or clamping pipes of tubings in the sections 1 and 2 and sections 15, I employ a jig which is shown associated with the sections 15 in Figure 8. This jig includes a plate 26 that has depending therefrom tapered sleeves 27 adapted to be received in the collars and in wedging association therewith. The plate has provided adjacent the outer ends thereof openings through which are passed the threaded shanks 28 of hook members 29, the latter receiving the lugs 22 as shown. Of course the jig is removed when the tubing is fixed within the collars, and then the tubular U-shape coupling member is associated with the collars and clamped thereon through the instrumentality of the saddle clamps as has been previously set forth. It will be obvious that the pipes or tubing are swaged or rolled within the annular grooves formed in the collars of the sections as shown.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A coupling of the character described comprising a pair of sections, means for securing the sections in parallelism with respect to each other, a tubular U-shape coupling member having tapered ends disposed in the sections and in wedging association therewith, a rib formed with the tubular U-shaped coupling member, and clamping means provided with a groove to receive said rib and detachably secured to the sections for securing the tubular U-shape coupling member to the sections.

2. A coupling of the character described comprising a pair of sections, hook means for securing said sections together in parallelism with respect to each other, a tubular U-shape coupling member having tapered ends and received in said sections in the manner to set up a wedging action, an inclined lug formed with one of said sections, a saddle clamp including a hook receiving the lug, said saddle clamp disposed about the tubular U-shape coupling member and means cooperating with the hook and lug for detachably associating the saddle clamp to the tubular U-shape coupling member and sections respectively for accordingly securing the same together.

3. A coupling of the character described comprising a pair of sections, means for connecting the sections in parallelism with respect to each other, a lug formed with one of said sections, slotted ears formed with the other section, a tubular U-shape coupling member having tapered ends received in the sections, a rib extending longitudinally of the tubular U-shape coupling member, a saddle clamp provided with a groove to receive the rib, a hook formed with one end of said saddle clamp and receiving the lug, the opposite end of said saddle clamp being notched with its notch aligned with the slots, and a wedge extending through the slots and notch.

4. A coupling of the character described comprising a pair of sections including conical collars, means for securing the sections together in parallelism with respect to each other, a tubular U-shape coupling member having tapered ends wedgedly received in the collars, a lug formed with one section, spaced parallel slotted ears formed with the other section, a rib extending longitudinally of the tubular U-shape coupling member, a saddle clamp provided with a groove to receive the rib, a hook formed with one end of said saddle clamp and receiving the lug, the opposite end of said saddle clamp being provided with a notch disposed between the ears and in alignment with the slots thereof, and a wedge passing through the slots and received in said notch.

5. A coupling of the character described comprising a pair of sections, means for securing the sections together in parallelism with respect to each other, lugs formed with said sections, a tubular U-shape coupling member having its ends received in the sections, a rib formed with the coupling member, a clamping member including sections provided with grooves to receive the rib, hooks formed with one of the ends of the sections for receiving the lugs, and wedge means for securing the opposite ends of the sections together about the coupling member.

6. A coupling of the character described comprising a pair of sections, means for securing the sections together in parallelism with respect to each other, lugs formed with the outer sides of the sections, a tubular U-shape coupling member having tapered ends received in said sections, a rib longitudinally arranged on the coupling member, a clamping means including a pair of sections provided with grooves to receive the rib, hooks formed with the outer ends of the clamping sections and receiving the lugs, spaced parallel ears provided with slots and being formed with the opposite end of one of the clamping sections, an extension formed with the opposite end of the other clamping section and being provided with a notch aligned with the slots of the ears, and a wedge received in the slots and notch.

In testimony whereof I affix my signature.

HARRY SCHMIEG.